(12) United States Patent
Wei et al.

(10) Patent No.: US 10,525,756 B2
(45) Date of Patent: Jan. 7, 2020

(54) THERMAL TRANSFER INK COMPOSITION, A DOMESTIC THERMAL TRANSFER KIT AND A THERMAL TRANSFER METHOD

(71) Applicant: SHANGHAI NNW NEW MATERIALS TECHNOLOGY CO., LTD., Shanghai (CN)

(72) Inventors: Qian Wei, Shanghai (CN); Liang Long, Shanghai (CN)

(73) Assignee: SHANGHAI NNW NEW MATERIALS TECHNOLOGY CO., LTD., Shanghai (CN)

( * ) Notice: Subject to any disclaimer, the term of this patent is extended or adjusted under 35 U.S.C. 154(b) by 32 days.

(21) Appl. No.: 15/858,329

(22) Filed: Dec. 29, 2017

(65) Prior Publication Data

US 2019/0001724 A1    Jan. 3, 2019

(30) Foreign Application Priority Data

Dec. 30, 2016    (CN) .......................... 2016 1 1257224

(51) Int. Cl.
| | |
|---|---|
| *B41M 5/392* | (2006.01) |
| *C09D 11/033* | (2014.01) |
| *C09D 11/102* | (2014.01) |
| *C09D 11/106* | (2014.01) |
| *C09D 11/037* | (2014.01) |

(52) U.S. Cl.
CPC ........... *B41M 5/392* (2013.01); *C09D 11/033* (2013.01); *C09D 11/037* (2013.01); *C09D 11/102* (2013.01); *C09D 11/106* (2013.01)

(58) Field of Classification Search
CPC ....... C09D 11/328; C09D 11/32; C09D 11/40; C09D 11/102; C09D 11/106; C09D 11/033; C09D 11/037; B41M 5/30; B41M 5/392

See application file for complete search history.

(56) References Cited

U.S. PATENT DOCUMENTS

| 9,428,658 B2 * | 8/2016 | Hofstra | .................. C09D 11/14 |
|---|---|---|---|
| 2016/0090493 A1 * | 3/2016 | Hofstra | .................. C09D 11/14 |
| | | | 347/103 |

* cited by examiner

*Primary Examiner* — Huan H Tran
(74) *Attorney, Agent, or Firm* — Flener IP & Business Law; Zareefa B. Flener

(57) ABSTRACT

A thermal transfer ink composition, a domestic thermal transfer kit, and a thermal transfer method is provided. The thermal transfer ink composition comprises a disperse dye, a resin, an additive, an auxiliary solvent and a main solvent. The domestic thermal transfer kit comprises an ink cartridge, a writing instrument, high temperature resistant tapes and writing media. The writing instrument comprises a cotton core type, a capillary liquid type and a valve type; The method comprises the following steps: using a writing instrument to form writing marks on the surface of a writing medium; pasting the writing medium onto the surface of a thermal transfer medium by the use of high temperature resistant tapes; applying a heat source to the writing medium and then removing the heat source to obtain the well-transferred thermal transfer medium.

14 Claims, 1 Drawing Sheet

The drawings of the manual
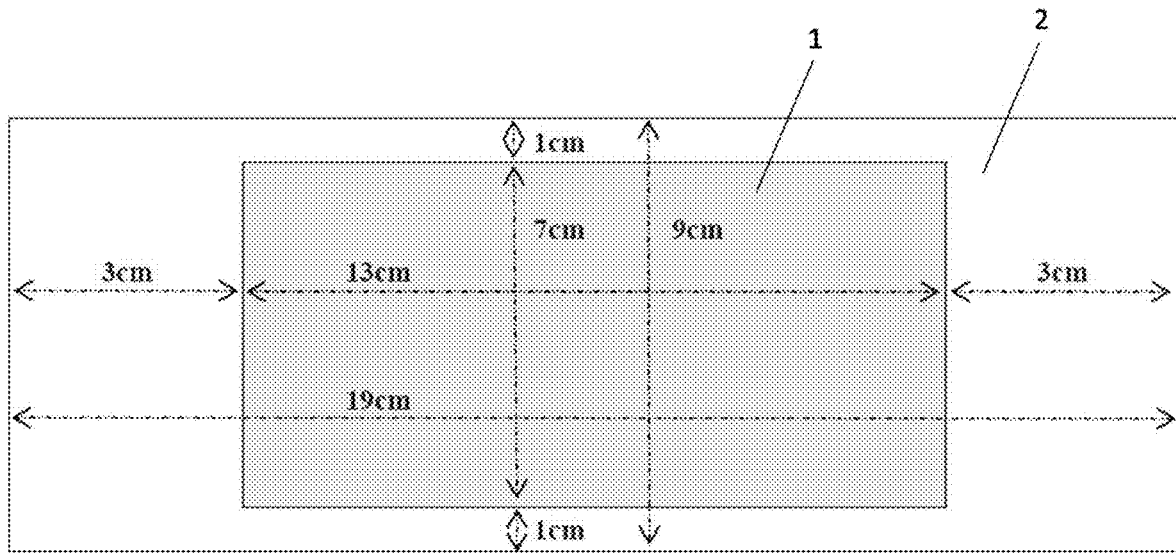

THERMAL TRANSFER INK COMPOSITION, A DOMESTIC THERMAL TRANSFER KIT AND A THERMAL TRANSFER METHOD

TECHNICAL FIELD

The invention belongs to the technical field of printing ink and relates to a thermal transfer ink composition, a domestic thermal transfer kit and a thermal transfer method.

BACKGROUND

Sublimation ink is one of thermal transfer inks, main component of which is a disperse dye with low molecular weight and property of easy sublimation. The inks can form images on transfer papers and then the images can be transferred to such materials as cloth, ceramic, wood, leather by means of heating. However, the professional transfer equipments are necessarily required during transferring processes as for the commonly used sublimation inks, and various types of printers are also needed to make such images. Although the mass production can be achieved, professional workers must be present to operate these expensive machines for current sublimation inks. Therefore, the consumer's special needs to produce images on small scales at home are yet to be satisfied.

SUMMARY OF THE INVENTION

To solve the problem above, the main purpose of the invention is to provide a thermal transfer ink composition.

The invention also provides a domestic thermal transfer kit by the use of the thermal transfer ink composition mentioned above.

The invention further provides a thermal transfer method by the use of the domestic thermal transfer kit.

To achieve the purposes above, the invention adopts the following technical solutions:

[The First Thermal Transfer Ink Composition]

A thermal transfer ink composition, wherein the thermal transfer ink composition comprises the following components: 1-8 wt % of a disperse dye, 0.5-2 wt % of a resin, 1-15 wt % of an additive, 5-25 wt % of an auxiliary solvent and a main solvent as the rest.

Wherein, the disperse dye is selected from the group consisting of disperse yellow, disperse blue and disperse red.

The resin is selected from the group consisting of polyvinyl alcohol, polyacrylic acid, polypyrrolidone and polyethylene glycol.

The additive is selected from the group consisting of a dispersant, a wetting agent, an antifoaming agent and a sterilization anti mold agent.

The auxiliary solvent is selected from the group consisting of n-propanol, n-butanol, propanediol, butanediol, pentadiol, glycerol, propylene glycol monomethyl ether and propanediol butyl ether. Preferably, the dispersant is selected from acrylic acid block polymer or sodium cellulose xanghate; the wetting agent is polysiloxane; the antifoaming agent is hydrophobic silicon dioxide or mineral oil; the sterilization anti mold agent is bronopol and/or isothiazolinone. The main solvent is water.

[The First Domestic Thermal Transfer Kit]

A domestic thermal transfer kit, wherein the domestic thermal transfer kit comprises an ink cartridge for storing the first thermal transfer ink composition, a cotton core type writing instrument, high temperature resistant tapes and writing media. Wherein, the porosity of the writing head of the cotton core type writing instrument is 35-70%, and the density of the cotton core in the cotton core type writing instrument is 0.1-0.25 g·cm$^{-3}$, or preferably 0.15-0.20 g·cm$^{-3}$.

[The Second Thermal Transfer Ink Composition]

A thermal transfer ink composition, wherein the thermal transfer ink composition comprises the following components: 1-8 wt % of a disperse dye, 0.5-2 wt % of a resin, 0.5-2 wt % of a viscosity modifier, 1-15 wt % of an additive, 5-15 wt % of an auxiliary solvent and a main solvent as the rest.

Wherein, the disperse dye is selected from the group consisting of disperse yellow, disperse blue and disperse red.

The resin is selected from the group consisting of polyethylene glycol, alkyd resin and polypyrrolidone.

The viscosity modifier is selected from the group consisting of polyurethane associative thickener, polyacrylate thickener and cellulose thickener.

The additive is selected from the group consisting of a dispersant, a wetting agent, an antifoaming agent and sterilization anti mold agent.

The auxiliary solvent is selected from the group consisting of n-propanol, n-butanol, propanediol, butanediol, pentadiol, glycerol, propylene glycol monomethyl ether and propanediol butyl ether; wherein, the dispersant is selected from acrylic acid block polymer or sodium cellulose xanghate; the wetting agent is polysiloxane; the antifoaming agent is hydrophobic silicon dioxide or mineral oil; the sterilization anti mold agent is bronopol and/or isothiazolinone.

The main solvent is water.

[The Second Domestic Thermal Transfer Kit]

A domestic thermal transfer kit, wherein the domestic thermal transfer kit comprises an ink cartridge for storing the second thermal transfer ink composition, a capillary liquid type writing instrument, high temperature resistant tapes and writing media.

The porosity of the writing head of the capillary liquid type writing instrument is 35-70%.

[The Third Thermal Transfer Ink Composition]

A thermal transfer ink composition, wherein the thermal transfer ink composition comprises: 1-8 wt % of a disperse dye, 1-5 wt % of a resin, 1-5 wt % of a viscosity modifier, 1-15 wt % of an additive, 5-15 wt % of an auxiliary solvent and a main solvent as the rest.

Wherein, the disperse dye is selected from the group consisting of disperse yellow, disperse blue and disperse red;

The resin is selected from the group consisting of polyethylene glycol, alkyd resin and polypyrrolidone.

The viscosity modifier is selected from the group consisting of polyurethane associative thickener, polyacrylate thickener and cellulose thickener.

The additive is selected from the group consisting of a dispersant, a wetting agent, an antifoaming agent and a sterilization anti mold agent.

The auxiliary solvent is selected from the group consisting of n-propanol, n-butanol, propanediol, butanediol, pentadiol, glycerol, propylene glycol monomethyl ether and propanediol butyl ether. Wherein, the dispersant is selected from acrylic acid block polymer or sodium cellulose xanghate; the wetting agent is polysiloxane; the antifoaming agent is hydrophobic silicon dioxide or mineral oil; the sterilization anti mold agent is bronopol and/or isothiazolinone.

The main solvent is water.

[The Third Domestic Thermal Transfer Kit]

A domestic thermal transfer kit, wherein the domestic thermal transfer kit comprises an ink cartridge for storing the third thermal transfer ink composition, a valve type writing instrument, high temperature resistant tapes and writing media.

The porosity of the writing head of the valve type writing tool is 35-70%.

[A Domestic Thermal Transfer Method]

A domestic thermal transfer method comprising the following steps:

(1) Using a writing instrument to form writing marks on the surface of a writing medium;

(2) Pasting the writing medium onto the surface of a thermal transfer medium by the use of high temperature resistant tapes and contacting the surface having the writing marks of the writing medium with the surface to be transferred of the thermal transfer medium;

(3) Applying a heat source to the writing medium for 0.1 to 10 minutes and then removing the heat source; removing the high temperature resistant tapes and the writing medium after the temperature of the thermal transfer medium has dropped to room temperature to obtain the well-transferred thermal transfer medium.

Wherein, the writing instrument is any one selected from the group consisting of a cotton core type writing instrument, a capillary liquid type writing instrument and a valve type writing instrument. Different ink composition is suitable to its corresponding writing instrument.

Due to the solutions above, this invention achieves the following beneficial effects:

Firstly, the thermal transfer ink compositions in this invention possess different degrees of viscosity so as to be able to be applied to different kinds of writing instruments, which help users draw different kinds of images; In addition, different writing instruments can be used to draw images on the same writing medium to meet the requirements of free design.

Secondly, through the use of the thermal transfer method in this invention, the patterns formed by thermal transfer ink composition can be transferred to the surface of heat transfer medium by commonly used domestic appliances without the need to use large complex transfer printing equipment. Therefore, the instant, rapid and simple thermal transfer can be easily fulfilled.

The thermal transfer ink compositions in the invention have various viscosity so that they can be applied to many different writing instruments. In addition, the thermal transfer method of the invention can be readily achieved through the mere use of domestic appliances, so that the instant, rapid and simple thermal transfer can be easily fulfilled.

BRIEF DESCRIPTION OF THE DRAWINGS

FIG. 1 is a schematic view showing how high temperature resistant tape sticks to writing medium in this invention.

Reference numbers of FIGURE are the following.

Thermal transfer paper 1, high temperature resistant tape 2.

DETAILED DESCRIPTION

This invention provides thermal transfer ink compositions, domestic thermal transfer kits and thermal transfer methods.

<The First Thermal Transfer Ink Composition>

A thermal transfer ink composition which is suitable for a cotton core type writing instrument comprises the following components: 1-8 wt % of a disperse dye, 0.5-2 wt % of a resin, 1-15 wt % of an additive, 5-25 wt % of an auxiliary solvent and a main solvent as the rest.

The content of the components above can be adjusted arbitrarily within their own numerical ranges as long as the sum of each component is 100 wt %.

Various physical and chemical properties of the first thermal transfer ink composition in this invention are as follows:

(1) The final pH value is 4-9, which is measured by pH meter.

(2) The final viscosity is 6-18 cP, which is measured by rotational viscosimeter.

(3) The final surface tension is 25-35 mN·m$^{-1}$, which is measured by surface tension meter.

(4) The final storage stability is evaluated as Grade A through experiments; the stability testing method is as follows: calmly storing the ink composition at room temperature for 12 months, and then observing whether such phenomena as flocculation, sediment or crystal substance occurs; If no flocculation, sediment or crystal is observed after 12 months, the ink composition is evaluated as Grade A; if some flocculation, sediment or crystal is observed between 9 and 12 months, the ink composition is evaluated as Grade B; If flocculation, sediment or crystal is observed between 6 and 9 months, the ink composition is evaluated as Grade C; if flocculation, sediment or crystal is observed between 0 and 6 months, the ink composition is evaluated as Grade D, that is, it is regarded as substandard product.

(5) The maximum withstand temperature of the final thermal stability is 60° C. The thermal stability testing method is as follows: putting the ink composition in the oven at a constant temperature of 60° C. for a month; after being taken out, the fluctuations of the pH value, viscosity and surface tension of the ink are less than 20%.

[Disperse Dye]

Disperse dye has the advantages of low molecular weight, easy sublimation ability and high temperature stability, which not only ensure that the transfer can be carried out at lower temperatures, but also guarantee that its own molecular structure are not being destroyed during the transfer process so that a clear transfer pattern can be formed.

The disperse dye is selected from the group consisting of disperse yellow, disperse blue and disperse red. Wherein, the disperse red dye can be selected from the group consisting of No. 4, 22, 55, 59, 60, 142, 152, 177, 191 and 302; disperse blue dye can be selected from the group consisting of No. 14, 28, 56, 60, 72, 73, 334, 336 and 359; disperse yellow dye can be selected from the group consisting of No. 23, 42, 51, 54, 60, 64, 65, 82, 98, 119, 160 and 211; disperse dye shall have good stability under the temperature of 25-200° C.

The content of the disperse dye is generally 1 to 8 wt %, preferably 3 to 7 wt %, more preferably 4 to 6 wt %, more preferably 4.5 to 5.5 wt %, and most preferably 5%. Research shows that if the content of the disperse dye is less than 1 wt %, the color of the thermal transfer ink composition is too shallow, which affects the clarity of the transferred pattern. If the content of the disperse dye is higher than 8 wt %, more dispersant will be needed to disperse the dyes and the stability of the thermal transfer ink composition system will be affected, which will make it easy to precipitate and reduce its storage time.

[Resin]

The resin is selected from the group consisting of polyvinyl alcohol, polyacrylic acid, polypyrrolidone and polyethylene glycol. On the one hand, the resin allows the ink composition to form smooth writing marks on the writing media; On the other hand, the ink composition system maintains a certain overall viscosity over a long period of time so that it can be applied to the above-mentioned cotton core writing tool.

The inventors find that when the molecular weight of the resin is too high, it is difficult to get dissolved and the manufacture process becomes very difficult. When the molecular weight is too low, the effect of film formation reduces. Therefore, the molecular weight of the polyvinyl alcohol is preferably between 10,000 to 50,000, also can be between 20,000 to 40,000; the molecular weight of the polyacrylic acid is preferably between 4000 and 20,000, also can be between 10,000 and 15,000; the molecular weight of the polypyrrolidone is preferably between 3000 and 15,000, also can be between 5000 and 10,000; the molecular weight of the polyethylene glycol is preferably between 6000 and 20,000, also can be between 10,000 and 15,000.

The content of the above-mentioned resin is generally 0.5 to 2 wt %, preferably 0.6 to 1.8 wt %, and more preferably 1 to 1.5 wt %, or preferably 1.2 to 1.3 wt %. Research shows that when the content of the resin is too low, the overall viscosity of the ink composition is too low so that it cannot be applied to a cotton core writing instrument. When the content of the resin is too high, the overall viscosity of the ink composition is too high, resulting in that the ink has poor fluidity and bad fluency in writing.

[Additive]

The additive is selected from the group consisting of a dispersant, a wetting agent, an antifoaming agent and sterilization anti mold agent.

The content of additives above is generally 1-15 wt %, preferably 2 to 12 wt %, or preferably 3 to 10 wt %, and more preferably 4 to 8 wt %, or preferably 5 to 7 wt %.

Wherein, the dispersant is selected from acrylic acid block polymer containing carboxylic acid group or sulfonic sodium radical, or from sodium cellulose xanghate.

The wetting agent is polysiloxane.

The antifoaming agent is hydrophobic silicon dioxide and/or mineral oil.

The sterilization anti mold agent is selected from the group consisting of bronopol and/or isothiazolinone. If the additive is composed of a dispersant, a wetting agent, a defoaming agent and a sterilization anti mold agent, the weight ratio of the dispersant, wetting agent, antifoaming agent and sterilization anti mold agent is (0.4-11):(0.2-2):(0.2-1):(0.2-1).

[Auxiliary Solvent]

The auxiliary solvent can be an alcoholic solvent and/or an ether solvent.

The alcoholic solvent can be selected from the group consisting of n-propanol, n-butanol, propanediol, butanediol, pentadiol and glycerol. The alcoholic solvent has a function of moisturizing, which can prolong the uncap time of the ink composition after it has been injected into the writing tool.

The ether solvent can be selected from the group consisting of propylene glycol methyl ether and propylene glycol butyl ether. The ether solvent can adjust the surface tension of the ink composition and improve the flow leveling effect of the ink composition after it's been written by the writing tool.

If the auxiliary solvent is a mixture of an alcoholic solvent and an ether solvent, the weight ratio of alcoholic solvent and the ether type solvent is (1-10): 1.

The content of the auxiliary solvent is generally 5 to 25 wt %, preferably 7 to 22 wt %, more preferably 10 to 20 wt %, still more preferably 12 to 18 wt %, also preferably 14 to 17 wt %, or preferably 15-16 wt %. Research shows that if the content of the auxiliary solvent is less than 5 wt %, the ink composition can make the writing head to dry during the writing process. If the content of the auxiliary solvent is higher than 25 wt %, the drying speed is slow after the ink composition is formed on the writing medium. Meanwhile, the function of the dispersant is also affected, and thus the stability of the ink composition system is reduced.

[Main Solvent]

The main solvent is used to dissolve the various components of the ink composition, and can be preferably water. As the main solvent, water has the advantages of non-toxicity and harmlessness, by which the user is very easy to draw the pattern or imprint manually; In addition, the water will only be evaporated into the form of water vapor in the transfer process, which has no affect on the other components and even does not cause pollution to the indoor environment.

<The Preparation Method of the First Thermal Transfer Ink Composition>

The method for preparing the first thermal transfer ink composition, wherein the method includes the following steps:

(1) Adding a wetting agent, an antifoaming agent and a dispersant (as additives) into water (as main solvent) and stirring them to a uniform state to obtain the first mixture;

(2) Adding the disperse dyes into the first mixture, and dispersing it by using a shear disperser until obtaining an evenly flowing second mixture;

(3) Grinding the second mixture with a sand mill until its particle size is less than 300 nm to obtain the third mixture;

(4) Adding a resin and an auxiliary solvent to the third mixture, stirring well to obtain a fourth mixture;

(5) Adding sterilization anti mold agent (As an additive) to the fourth mixture, stirring the mixture and then filtering and subpackaging it to obtain the first thermal transfer ink composition.

[The First Domestic Thermal Transfer Kit]

A domestic thermal transfer kit comprises an ink cartridge for storing the first thermal transfer ink composition, a cotton core type writing instrument, high temperature resistant tapes and writing media.

The ink cartridge is used to store the thermal transfer ink composition described above. If the thermal transfer ink compositions have many kinds of colors, each of the ink cartridges stores one kind of thermal transfer ink composition.

The cotton core type writing tool is used to make the thermal transfer ink composition form writing marks on a writing medium. The porosity of the writing head of the cotton core type writing tool is 35-70%, preferably 40-60%, also preferably 45-55%, or even 55%. The porosity of the writing head is defined as the ratio of internal air volume and total volume of the writing head. Research shows that if the porosity of the writing head is less than 35%, the writing head is easily blocked by the ink composition. If the porosity of the writing head is higher than 70%, the attractive force of the writing head to the ink composition is too low to form effective writing marks or patterns. The use of the writing head above can make sure that the ink flow of writing head is smooth, and not easy to plug.

The writing medium is used to make the thermal transfer ink composition to produce writing marks on its surface; thermal transfer paper can be used.

The high temperature resistant tape is used to attach the writing medium to the surface of the transfer medium and make the side of the writing medium having the writing marks contact with the surface of the transfer medium. The high temperature resistant tape is made of polyimide material and can withstand up to 300° C.

The main components of the cotton core type writing tool include: pen holder, cotton core, writing head and pen cap.

Examples of the transfer media to which the thermal transfer ink composition in the invention is applied can be fabrics, textile garments, porcelain, metal, and so on. It has been proved that the ink composition of the invention has good color retention performance and the disperse dye is not affected by other components in storage and being transferred, thus the disperse dye can be completely transferred to the surface of the transfer medium without any hindrance. Moreover, the disperse dye can fully penetrate into the inside of the transfer medium and closely bind with it at a certain temperature and under a certain pressure; so it is not easy to fade.

[The Second Thermal Transfer Ink Composition]

A thermal transfer ink composition, wherein the thermal transfer ink composition comprises the following components: 1-8 wt % of a disperse dye, 0.5-2 wt % of a resin, 0.5-2 wt % of a viscosity modifier, 1-15 wt % of an additive, 5-15 wt % of an auxiliary solvent and a main solvent as the rest.

The content of the component above can be adjusted arbitrarily within the range of each component as long as the sum of each component is 100 wt %.

Various physical and chemical properties of the second thermal transfer ink composition in this invention are as follows:

(1) The final pH value is 4-9, which is measured by pH meter.

(2) The final viscosity is 3-30 cP, which is measured by rotational viscosimeter.

(3) The final surface tension is 25-40 mN·m$^{-1}$, which is measured by surface tension meter.

(4) The final storage stability is evaluated as Grade A through experiments.

(5) The maximum tolerable temperature of the final thermal stability is 60° C. The thermal stability testing method is as follows: putting the ink composition in the oven at a constant temperature of 60° C. for a month; after being taken out, the fluctuations of the pH value, viscosity and surface tension of the ink are less than 20%.

The viscosity modifier is selected from the group consisting of polyurethane associative thickener, polyacrylate thickener and cellulose thickener. The detailed selection of the components of the second thermal transfer ink composition can be referred to the relevant description in the first thermal transfer ink composition.

Unlike the cotton core type writing tool, a wider range of viscosity of ink composition is required to accommodate different types of capillary liquid type writing tools, which cannot be adjusted by the resin alone. Therefore, it is necessary to introduce a viscosity modifier. The viscosity modifier is required to coexist stably with the resin, preferably a polyurethane associative thickener. Because the ink composition is free to flow in the water reservoir, there are no inverted water requirements (let the writing head up, flat, and down for a month, no obvious changes in depth) for such parts. While for the cotton core type, the ink composition is adsorbed in the cotton core. Therefore, the capillary liquid type writing tool does not have high requirement for resin only if it has good film-forming property.

In fact, by the adjustment of the viscosity of the second thermal transfer ink composition (e.g., adjusting it to 6-18 cP), the ink composition can be applied to both cotton core type writing instrument and capillary liquid type writing instrument.

<The Preparation Method of the Second Thermal Transfer Ink Composition>

The method for preparing the second thermal transfer ink composition includes the following steps:

(1) Adding a wetting agent, an antifoaming agent and a dispersant (as additives) into water (as main solvent) and stirring them to a uniform state to obtain the first mixture;

(2) Adding the disperse dyes into the first mixture, and dispersing it by using a shear disperser until obtaining a evenly flowing second mixture;

(3) Grinding the second mixture with a sand mill until its particle size is less than 300 nm to obtain the third mixture;

(4) Adding a resin and an auxiliary solvent to the third mixture, and stirring well to obtain a fourth mixture;

(5) Adding viscosity modifier and sterilization anti mold agent (As an additive) to the fourth mixture, stirring the mixture and then filtering and subpackaging it to obtain the second thermal transfer ink composition.

[The Second Domestic Thermal Transfer Kit]

A domestic thermal transfer kit comprises at least one ink cartridge, a capillary liquid type writing instrument, high temperature resistant tapes and writing media.

The ink cartridge is used to store the thermal transfer ink composition described above. If the thermal transfer ink compositions have many kinds of colors, each of the ink cartridges stores one kind of thermal transfer ink composition.

The capillary liquid type writing tool is used to make the thermal transfer ink composition form writing marks on a writing medium. The porosity of the writing head of the capillary liquid type writing tool is 35-70%, preferably 40-70%, also preferably 50-60%. The use of the writing head above can make sure that the ink flow of writing head is smooth, and not easy to plug.

The writing medium is used to make the thermal transfer ink composition to produce writing marks on its surface.

The high temperature resistant tape is used to attach the writing medium to the surface of the transfer medium and make the side of the writing medium having the writing marks contact with the surface of the transfer medium. The high temperature resistant tape is made of polyimide material and can withstand up to 300° C.

The main components of the capillary liquid type writing tool include: water storage, a transmission unit, a water drainage core, a writing head and a pen cap.

[The Third Thermal Transfer Ink Composition]

A thermal transfer ink composition comprises the following components: 1-8 wt % of a disperse dye, 1-5 wt % of a resin, 1-5 wt % of a viscosity modifier, 1-15 wt % of an additive, 5-15 wt % of an auxiliary solvent and a main solvent as the rest.

The content of the above component can be adjusted arbitrarily within the range of each component as long as the sum of each component is 100 wt %.

Various physical and chemical properties of the third thermal transfer ink composition in this invention are as follows:

(1) The final pH value is 4-9, which is measured by pH meter.

(2) The final viscosity is 20-150 cP, preferably 20-50 cP, which is measured by rotational viscosimeter.

(3) The final surface tension is 25-40 mN·m$^{-1}$, which is measured by surface tension meter.

(4) The final storage stability is evaluated as Grade A through experiments.

(5) The maximum withstand temperature of the final thermal stability is 60° C. The thermal stability testing method is as follows: putting the ink composition in the oven at a constant temperature of 60° C. for a month; after being taken out, the fluctuations of the pH value, viscosity and surface tension of the ink are less than 20%.

The viscosity modifier is selected from the group consisting of polyurethane associative thickener, cellulose thickener and polyacrylate thickener. The amount of the viscosity modifier is higher than that of the capillary liquid type, and can be further preferably 2-3 wt %. The viscosity of ink composition suitable for the valve typewriting tool is higher than that of the cotton core type and the capillary liquid type. If the viscosity is too low, the ink will flow out quickly after the valve has been loosen, resulting in leakage of ink.

The amount of moisturizing agent in the auxiliary solvent is lower than that of the cotton core type and the capillary liquid type. For the valve type writing tool, the amount of ink flowing out is too high, and too much moisturizing agent will cause the ink to dry too slowly so that the content of auxiliary solvent can be further preferably 8-10 wt %.

The detailed selection of the components of the third thermal transfer ink composition can be referred to the relevant description in the first the thermal transfer ink composition.

<The Preparation Method of the Third Thermal Transfer Ink Composition>

The method for preparing the third thermal transfer ink composition includes the following steps:

(1) Adding a wetting agent, an antifoaming agent and a dispersant (as additives) into water (as main solvent) and stirring them to a uniform state to obtain the first mixture;

(2) Adding the disperse dyes into the first mixture, and dispersing it by using a shear disperser until obtaining a evenly flowing second mixture;

(3) Grinding the second mixture with a sand mill until its particle size is less than 300 nm to obtain the third mixture;

(4) Adding a resin and an auxiliary solvent to the third mixture, and stirring well to obtain a fourth mixture;

(5) Adding viscosity modifier and sterilization anti mold agent (As an additive) to the fourth mixture, stirring the mixture and then filtering and subpackaging it to obtain the third thermal transfer ink composition.

[The Third Domestic Thermal Transfer Kit]

A domestic thermal transfer kit contains at least one ink cartridge, valve type writing tool, high temperature resistant tape and writing medium.

The ink cartridge is used to store the thermal transfer ink composition described above. If the thermal transfer ink compositions have many kinds of colors, each of the ink cartridges stores one kind of thermal transfer ink composition.

The valve type writing tool is used to make the thermal transfer ink composition form writing marks on a writing medium. The porosity of the writing head of the capillary liquid type writing tool is 35-70%, preferably 40-70%, also preferably 50-60%. The use of the above writing head can make sure that the ink flow of writing head is smooth, and not easy to plug.

The writing medium is used to make the thermal transfer ink composition to produce writing marks on its surface.

The high temperature resistant tape is used to attach the writing medium to the surface of the transfer medium and make the side of the writing medium having the writing marks contact with the surface of the transfer medium. The high temperature resistant tape is made of polyimide material and can withstand up to 300° C.

The main components of the valve type writing tool include: a water storage, balls, valves, pen head and pen cap.

[Domestic Thermal Transfer Method]

A domestic thermal transfer method, wherein the method comprises the following steps:

(1) Using a writing instrument to form writing marks on the surface of a writing medium and waiting till the writing marks become dried;

(2) Pasting the high temperature resistant tapes 2 onto the outer rims of the writing medium (thermal transfer paper 1) (See FIG. 1) and then pasting the writing medium onto the surface of a thermal transfer medium and closely contacting the surface having the writing marks of the writing medium with the surface to be transferred of the thermal transfer medium (without the need of extra pressure);

(3) Applying a heat source to the writing medium for a period of time and then removing the heat source; removing the high temperature resistant tapes and the writing medium to obtain the well-transferred thermal transfer medium;

Wherein, in step (1), the writing instrument is any one selected from the group consisting of a cotton core type writing instrument, a capillary liquid type writing instrument and a valve type writing instrument.

In step (3), the heat source is supplied by domestic appliance, including an electric iron, a microwave oven, an electric oven, and so on. The heating temperature of each domestic appliance is shown in Table 1.

TABLE 1

Heating temperature of different domestic appliances

| Tool | Temperature/gears | Time |
|---|---|---|
| Electric iron | Cotton, hemp gears | 20-40 seconds |
| Electric oven | 200° C. | 8-10 minutes |
| Microwave oven | 1000 W High fire blocked | 8-10 minutes |

The present invention will be further described in combination with the examples and comparative examples.

Example 1

This example provides an ink composition, which can have different colors. The components and their contents are shown in Table 2.

TABLE 2

Contents of components in the ink composition

| categories | components | red content (wt %) | blue content (wt %) | yellow content (wt %) | black content (wt %) | green content (wt %) | violet content (wt %) | orange content (wt %) |
|---|---|---|---|---|---|---|---|---|
| main solvent | water | | | | the rest | | | |
| auxiliary solvent | glycerol | | | | 10 | | | |
| disperse dyes | Disperse red 60 # | 6 | — | — | 4 | — | 4 | 4 |
| | Disperse yellow 54 # | — | 5 | — | 5 | 4 | — | 2.5 |
| | Disperse blue 359 # | — | — | 6 | 3 | 4 | 3 | — |
| dispersant | sodium cellulose xanghate | | | | 2 | | | |
| resin | polyvinyl alcohol | | | | 1 | | | |
| additive | polysiloxane | | | | 0.2 | | | |
| | Bronopol | | | | 0.2 | | | |

The ink composition obtained in this example had a viscosity of 8-12 cP, a pH value of 6 to 8, and a surface tension of 28-34 mN·m$^{-1}$. The ink composition was injected into a cotton core type writing instrument and it could be written, marked and painted on the surface of a writing medium.

The thermal transfer method in this example was as follows:
(1) Using a cotton core type writing instrument to form writing marks on the surface of a writing medium;
(2) Pasting the writing medium onto the surface of a thermal transfer medium by the use of high temperature resistant tapes and contacting the surface having the writing marks of the writing medium with the surface to be transferred of the thermal transfer medium;
(3) Applying a heat source to the writing medium for a few minutes and then removing the heat source; removing the high temperature resistant tapes and the writing medium to obtain the well-transferred thermal transfer medium;

Wherein, the temperature and the heating time of the heat source dependents on the type of heat source, as shown in Table 1.

Comparative Example 1

In this comparative example, glycerol was replaced with water, and the detailed components of ink composition were shown in Table 3 below:

TABLE 3

Contents of components in the ink composition

| Categories | Components | Contents(wt %) |
|---|---|---|
| Solvent | Water | The rest |
| Disperse dye | Disperse red 60 # | 6 |
| Dispersant | Sodium cellulose xanghate | 2 |
| Resin | Polyvinyl alcohol | 1 |
| Additive | Polysiloxane | 0.2 |
| | Bronopol | 0.2 |

It was found that, when the ink without adding glycerol was injected into the writing tool, it was easy to cause the pen head to plug and become dried without the protection of pen cap, indicating that the auxiliary solvent could provide the ink composition with good moisturizing properties, which enhanced the intermittent writing performance.

Comparative Example 2

In the present comparative example 2, the polyvinyl alcohol resin was not added, and the detailed components of the ink composition were shown in Table 4 below:

TABLE 4

Content of components in the ink composition

| Categories | Components | Contents(wt %) |
|---|---|---|
| Solvent | Water | The rest |
| Auxiliary solvent | Glycerol | 10 |
| Disperse dyes | Disperse red 60 # | 6 |
| Dispersant | Sodium cellulose xanghate | 2 |
| Additive | Polysiloxane | 0.2 |
| | Bronopol | 0.2 |

It was found that, when polyvinyl alcohol resin was not added, the viscosity of the ink was much lower (3.5 cP), and it tended to precipitation. When the writing tool was placed upwards, the pen head was easy to fade; while pen was placed downward, the pen head was easy to plug or leak the ink.

Example 2

TABLE 5

Contents of components in the ink composition

| Categories | Components | Contents(wt %) |
|---|---|---|
| Solvent | Water | The rest |
| Auxiliary solvent | Glycerol | 8 |
| Disperse dyes | Disperse red 60 # | 7 |
| Dispersant | Sodium cellulose xanghate | 3 |
| Viscosity modifier | Acrylic thickener | 1 |
| Resin | Polyethylene glycol | 1 |
| Additive | Polysiloxane | 0.5 |
| | Bronopol | 0.2 |

It was found that the viscosity of the ink was 20 cP, the pH was 7.0 and the surface tension was 31 mN·m$^{-1}$ after the addition of the acrylic thickener. The ink was injected into the capillary liquid type-type parts and could be written smoothly.

Example 3

TABLE 6

Contents of components in the ink composition

| Categories | Components | Contents(wt %) |
| --- | --- | --- |
| Solvent | Water | The rest |
| Auxiliary solvent | Butylene glycol | 5 |
| Disperse dyes | Disperse red 60 # | 7 |
| Dispersant | Sodium cellulose xanghate | 3 |
| Viscosity modifier | Polyurethane associative thickener | 2 |
| Resin | Polypyrrolidone | 2 |
| Additive | Polysiloxane | 0.5 |
| | Bronopol | 0.2 |

It was found that the viscosity of the ink was 40 cP, the pH was 7.3 and the surface tension was 30 mN·m$^{-1}$ after the addition of the polyurethane thickener. The ink was injected into the valve-type parts, time for inking out was 30-50 seconds for the first time, and wrote smoothly.

Example 4

This example provides a domestic thermal transfer method comprising the following steps:

(1) Using cotton core type writing instrument to produce writing marks on the surface of writing medium.

(2) Pasting the writing medium to the surface of the thermal transfer medium (such as clothes) by using high temperature resistant tape, so that the side of the writing medium with the written mark is in close contact with the surface to be transferred of the transfer medium.

(3) Adjusting the electric iron to the cotton gear; applying a heat source to the writing medium; removing the heat source after waiting for 30 s; and then removing the high temperature resistant tape and the writing medium after cooling down to obtain a transferred medium.

Example 5

This example provides a domestic thermal transfer method comprising the following steps:

(1) Using a writing instrument to produce writing marks on the surface of writing medium.

(2) Pasting the writing medium to the surface of the thermal transfer medium (such as ceramic mug) by using high temperature resistant tape, so that the side of the writing medium with the written mark is in close contact with the surface to be transferred of the transfer medium.

(3) Adjusting the oven to 200° C. and applying a heat source to the writing medium; removing the heat source after waiting for 10 minutes; and then removing the high temperature resistant tape and the writing medium after cooling down to obtain a transferred medium.

The above-mentioned descriptions of the examples are intended to facilitate the understanding and applying of the invention by ordinary technician. The technician familiar with this field can modify these examples easily and the general principles described herein are applied to other examples without the need for creative labor. Therefore, the present invention is not limited to the above-described examples and the modifications and variations without departing from the scope of the invention are intended to be within the scope of the present invention.

We claim:

1. A thermal transfer ink composition, comprising the following components:
   1-8 wt % of a disperse dye,
   0.5-2 wt % of a resin,
   1-15 wt % of an additive,
   5-25 wt % of an auxiliary solvent and
   a main solvent.

2. The thermal transfer ink composition of claim 1, wherein
   the disperse dye is selected from the group consisting of disperse yellow, disperse blue and disperse red; and/or
   the resin is selected from the group consisting of polyvinyl alcohol, polyacrylic acid, polypyrrolidone and polyethylene glycol; and/or
   the additive is selected from the group consisting of a dispersant, a wetting agent, an antifoaming agent and a sterilization anti mold agent; and/or
   the auxiliary solvent is selected from the group consisting of n-propanol, n-butanol, propanediol, butanediol, pentadiol, glycerol, propylene glycol monomethyl ether and propanediol butyl ether; and/or
   the main solvent is water.

3. A domestic thermal transfer kit, wherein the domestic thermal transfer kit comprises
   an ink cartridge for storing the thermal transfer ink composition as stated in claim 1,
   a cotton core type writing instrument, and
   high temperature resistant tapes and writing media; wherein
   the porosity of the writing head of the cotton core type writing instrument is 35-70%, and the density of the cotton core in the cotton core type writing instrument is 0.1-0.25 g·cm$^{-3}$.

4. A thermal transfer ink composition, wherein the thermal transfer ink composition comprises the following components:
   1-8 wt % of a disperse dye,
   0.5-2 wt % of a resin,
   0.5-2 wt % of a viscosity modifier,
   1-15 wt % of an additive,
   5-15 wt % of an auxiliary solvent and
   a main solvent.

5. The thermal transfer ink composition of claim 4, wherein
   the disperse dye is selected from the group consisting of disperse yellow, disperse blue and disperse red; and/or
   the resin is selected from the group consisting of polyethylene glycol, alkyd resin and polypyrrolidone; and/or
   the viscosity modifier is selected from the group consisting of polyurethane associative thickener, polyacrylate thickener and cellulose thickener; and/or
   the additive is selected from the group consisting of a dispersant, a wetting agent, an antifoaming agent and a sterilization anti mold agent; and/or
   the auxiliary solvent is selected from the group consisting of n-propanol, n-butanol, propanediol, butanediol, pentadiol, glycerol, propylene glycol monomethyl ether and propanediol butyl ether; and/or
   the main solvent is water.

6. A domestic thermal transfer kit, wherein the domestic thermal transfer kit comprises
an ink cartridge for storing the thermal transfer ink composition as stated in claim 4 or 5,
a capillary liquid type writing instrument, and
high temperature resistant tapes and writing media; wherein
the porosity of the writing head of the capillary liquid type writing instrument is 35-70%.

7. A thermal transfer ink composition, wherein the thermal transfer ink composition comprises the following components:
1-8 wt % of a disperse dye,
1-5 wt % of a resin,
1-5 wt % of a viscosity modifier,
1-15 wt % of an additive,
5-15 wt % of an auxiliary solvent and
a main solvent.

8. The thermal transfer ink composition of claim 7, wherein
the disperse dye is selected from the group consisting of disperse yellow, disperse blue and disperse red; and/or
the resin is selected from the group consisting of polyethylene glycol, alkyd resin and polypyrrolidone; and/or
the viscosity modifier is selected from the group consisting of polyurethane associative thickener, polyacrylate thickener and cellulose thickener; and/or
the additive is selected from the group consisting of a dispersant, a wetting agent, an antifoaming agent and a sterilization anti mold agent; and/or
the auxiliary solvent is selected from the group consisting of n-propanol, n-butanol, propanediol, butanediol, pentadiol, glycerol, propylene glycol monomethyl ether and propanediol butyl ether; and/or
the main solvent is water.

9. A domestic thermal transfer kit, wherein the domestic thermal transfer kit comprises
an ink cartridge for storing the thermal transfer ink composition as stated in the claim 7 or 8,
a valve type writing instrument, and
high temperature resistant tapes and writing media; wherein
the porosity of the writing head of the valve type writing instrument is 35-70%.

10. A thermal transfer method comprising the following steps:
(1) Using a writing instrument to form writing marks on the surface of a writing medium;
(2) Pasting the writing medium onto the surface of a thermal transfer medium by the use of high temperature resistant tapes and contacting the surface having the writing marks of the writing medium with the surface to be transferred of the thermal transfer medium; and
(3) Applying a heat source to the writing medium for 0.1 to 10 minutes and then removing the heat source; removing the high temperature resistant tapes and the writing medium after the temperature of the thermal transfer medium has dropped to room temperature to obtain the well-transferred thermal transfer medium.

11. The thermal transfer ink composition of claim 2, wherein
the dispersant is selected from acrylic acid block polymer or sodium cellulose xanghate; and/or
the wetting agent is polysiloxane; and/or
the antifoaming agent is hydrophobic silicon dioxide or mineral oil; and/or
the sterilization anti mold agent is bronopol and/or isothiazolinone.

12. The thermal transfer ink composition of claim 5 wherein
the dispersant is selected from acrylic acid block polymer or sodium cellulose xanghate; and/or
the wetting agent is polysiloxane; and/or
the antifoaming agent is hydrophobic silicon dioxide or mineral oil; and/or
the sterilization anti mold agent is bronopol and isothiazolinone.

13. The thermal transfer ink composition of claim 8 wherein
the dispersant is selected from acrylic acid block polymer or sodium cellulose xanghate; and/or
the wetting agent is polysiloxane; and/or
the antifoaming agent is hydrophobic silicon dioxide or mineral oil; and/or
the sterilization anti mold agent is bronopol and/or isothiazolinone.

14. The thermal transfer method of claim 10 wherein the writing instrument is any one selected from the group consisting of a cotton core typewriting instrument, a capillary liquid type writing instrument and a valve type writing instrument.

* * * * *